Dec. 13, 1932.  G. G. ANDREWS  1,891,197
METHOD FOR CLEANING MOLDS
Filed Feb. 6, 1928

Inventor
George G. Andrews,

Attorney

Patented Dec. 13, 1932

1,891,197

UNITED STATES PATENT OFFICE

GEORGE G. ANDREWS, OF AKRON, OHIO, ASSIGNOR TO THE GOODYEAR TIRE & RUBBER COMPANY, OF AKRON, OHIO, A CORPORATION OF OHIO

METHOD FOR CLEANING MOLDS

Application filed February 6, 1928. Serial No. 252,121.

My invention relates to the art of cleaning, and it has particular relation to the cleaning of molds such as those employed in the manufacture of articles having a rubber constituent.

One object of the invention is to provide a method of cleaning molds that involves the immersion of such molds in a solution particularly adapted to remove foreign substances therefrom.

Another object of the invention is to provide a method of cleaning molds by immersing them in a cleaning solution under predetermined conditions of heat and pressure.

Another object of the invention is to provide an apparatus, in which certain conditions of heat and pressure may be applied to a cleaning solution contained in the apparatus.

A further object of the invention is to provide an apparatus in which a liquid solution may be utilized substantially continuously for cleaning molds.

In the manufacture of articles having a rubber constituent, it is common practice to cure them in molds which shape the articles during the curing thereof. During the curing operation, a hard rubber composition forms and adheres to the molds and unless removed, renders them unsuitable for further use. Ordinarily this composition consists of hard rubber, rubber pigments and soapstone in variable quantities, but, of course, other foreign substances also may be present. Heretofore, the composition has been removed manually by scrubbing, brushing, burning, etc., thereby requiring the expenditure of much time and labor.

According to my invention an apparatus and method of cleaning have been provided which minimize the labor and time heretofore required, and materially reduce the cost of cleaning the molds. The cleaning operation contemplates principally, the employment of a cleaning solution applied under certain conditions of heat and pressure, and into which the mold is immersed for a predetermined period of time.

For a better understanding of the invention, references may now be had to the accompanying drawing forming a part of this specification, in which.

Figure 1:
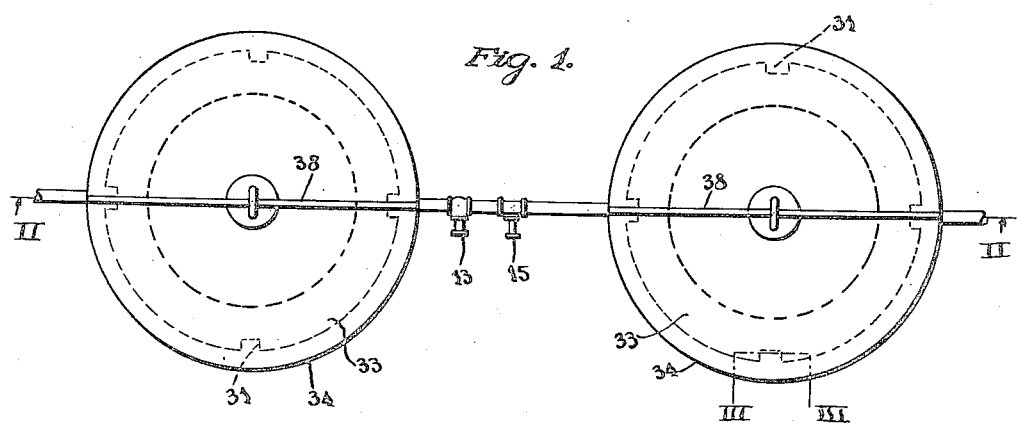
Fig. 1 is a plan view of an apparatus constructed according to the invention.

In practicing the invention, a pair of metallic vessels 10 and 11 are provided which are interconnected by a conduit 12, leading into each vessel through its base. Intermediately of its ends, the conduit 12 is provided with an ordinary valve 13 normally for maintaining the conduit closed, and a discharge conduit 14 having a one way valve 15 which also normally is closed. The vessels 10 and 11 are alike in construction and a description in detail of one will therefore suffice for both.

Figure 2:
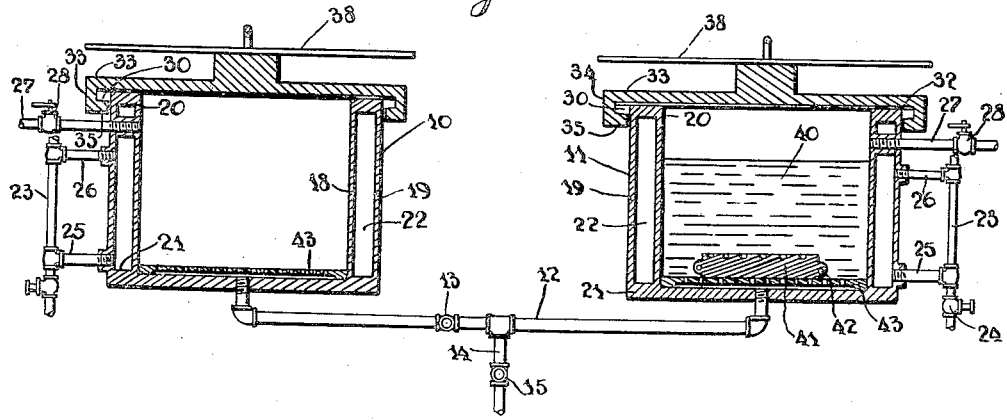
Fig. 2 is a cross-sectional view taken substantially along the line II—II of Fig. 1.

As particularly shown by Fig. 2 the vessel 11 comprises an inner container 18, and an outer container or jacket 19, integrally connected at their top and bottom edges by annular webs 20 and 21 respectively, whereby an annular chamber 22 is provided surrounding the inner container. A steam line conduit 23 having a valve 24 therein, communicates with the space 22, by means of conduits 25 and 26 which pass through the jacket 19, whereby steam may be circulated around the inner container 18. A conduit 27 leads into the inner container 18, and has a three-way valve 28 therein, for admitting air or other fluid under pressure into, or exhausting it from, the inner container.

Figure 3:
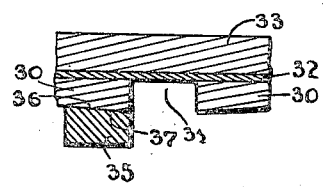
Fig. 3 is a fragmentary cross-sectional view, on a larger scale, taken substantially along the line III—III of Fig. 1.

A flange 30 is formed around the upper and outer edge of the jacket 19, and has a plurality of notches 31, (Fig. 1) spaced about its circumference. The upper surface of the vessel is provided with a gasket 32, which may be of any suitable material, and which is adapted to receive a cover 33. The cover has a depending flange 34, which terminates in inwardly directed lugs 35, approximately corresponding in circumferential length and in number to the notches 31 in the flange 30. Slightly tapered coacting surfaces 36 and 37, (Fig. 3) are provided on the flange 30 and lugs 35, respectively, whereby a wedging action may be secured between the lugs and the flange to secure firmly the cover 33 upon the vessel. The cover is mounted upon the vessel 11 by registering the lugs 35 with the openings 31, whereupon the cover moves downward by gravity until it abuts the gasket 32. A handle 38 is provided on the upper surface of the cover to facilitate turning of the cover to engage the lugs 35 with the flange 30 in the wedging relation previously referred to.

The vessel in operation contains a cleaning solution 40. A mold 41 constructed of iron or other suitable material, shown immersed in the solution, has a plurality of eyes 42 to facilitate the removal of the mold from the vessel. A perforated platform 43 is provided upon the bottom of the vessel to support the mold and also to prevent sediment from being carried into the conduit 12.

The cleaning material employed in the solution may consist of any basic material or materials which, after solution in water, hydrolize to give strong alkaline solutions. Examples of such materials are potassium hydroxide, sodium hydroxide, potassium sulphide, and sodium sulphide.

In operation of the device, a mold to be cleaned is placed in the vessel containing the alkaline solution, and the cover is tightly secured upon the vessel. Steam or other heat medium, at predetermined temperature and pressure, then is admitted into the space 22 and the solution heated to a vaporizing degree. As vapor is driven off from the solution, a pressure is generated thereon which in turn raises the vaporizing point of the solution. In this way the solution necessarily absorbs more heat to reach its new vaporizing point and in turn more pressure is generated. The solution absorbs heat until a point of equilibrium is reached, whereupon it has a temperature corresponding to the vapor pressure thereon. Under these conditions, the solution acts to loosen and, to some extent, dissolve the foreign composition on the mold.

The mold is allowed to remain in the solution for a predetermined period of time or until it has been found that the hard coating or compound on its surface is loosened or entirely removed. At this stage in the operation, the valve 13 in the conduit 12, which has been closed, is opened, and the pressure on the solution utilized to force the solution into the vessel 10, into which other molds have previously been placed. The valve 13 then is closed, and the cleaning operation continued in the latter vessel in the same manner as that previously described relative to the vessel 11.

The purpose of the conduit 27 is to supply an auxiliary pressure medium upon the solution. Ordinarily the vapor pressure generated upon the solution may be utilized to force the solution into the other vessel, but should the vapor pressure be insufficient, the auxiliary pressure medium may be utilized. The auxiliary pressure also may be employed in conjunction with the heating of the solution, in which case the vaporization point of the solution will be raised commensurately with the pressure applied.

The heat applied to the solution and the strength of the solution may vary considerably. When a steam pressure of 110 lbs. in the jacket, and a 15% sodium hydroxide solution are employed, the vapor pressure generated upon the solution is approximately 80 lbs. per sq. in., whereas if the strength of the solution is increased to 30%, the vapor pressure decreases to approximately 55 lb. per sq. in. A steam pressure of 91 lb. and a 15% solution, cause the vapor pressure upon the solution to be approximately 60 lb. per sq. in., decreasing to approximately 35 lb. with a 33% solution. It has been found satisfactory to employ a steam pressure of about 80 lb. per sq. in., with a 10% to 15% strength of solution, which results in a vapor pressure upon the solution of approximately 50 lbs.

While the description so far has related to cleaning in an alkaline solution subjected to certain conditions of heat and pressure, it is to be understood that the solution may be employed without the application of heat and pressure, and also that it may be subjected either to heat or pressure.

From the foregoing description it will be apparent that I have provided a method of cleaning which effectively and efficiently serves its purpose. The time, labor and expense formerly involved are minimized in a practical manner by the present method. Also, it will be apparent that an efficient and inexpensive apparatus has been provided which is peculiarly adapted to the method of cleaning employed. Moreover, the apparatus provides a means for substantially continuously utilizing the solution.

Although I have illustrated only the preferred form which my invention may assume, and have described that form in detail, it will be apparent to those skilled in the art that the invention is not so limited but that various modifications may be made therein without departing from the spirit of the invention or from the scope of the appended claim.

What I claim is:

The process of cleaning a metal mold, which comprises applying an alkaline solution to the mold in a confined space, heating the solution to generate a vapor pressure thereon and until the solution is at a temperature corresponding to the vapor pressure thereon, and removing the mold from the solution by utilizing the vapor pressure on the solution to force the latter out of the confined space.

In witness whereof, I have hereunto signed my name at Akron, in the county of Summit and State of Ohio, U. S. A., this 4th day of February, 1928.

GEORGE G. ANDREWS.